April 18, 1961 W. C. BRINKMAN 2,980,141
MIXING VALVE
Filed Jan. 5, 1959 2 Sheets-Sheet 1

INVENTOR.
WILLIAM C. BRINKMAN
BY
ATTORNEY

April 18, 1961 W. C. BRINKMAN 2,980,141
MIXING VALVE
Filed Jan. 5, 1959 2 Sheets-Sheet 2

INVENTOR.
WILLIAM C. BRINKMAN
BY
ATTORNEY

United States Patent Office 2,980,141
Patented Apr. 18, 1961

2,980,141

MIXING VALVE

William C. Brinkman, 448 W. 106th St.,
Los Angeles, Calif.

Filed Jan. 5, 1959, Ser. No. 785,034

2 Claims. (Cl. 137—637.2)

The present invention relates to mixing valves and has for an object the provision of a valve of this character, of simplified construction, readily adaptable for domestic or commercial use, and fool proof in operation.

The invention is adaptable to be used with water or other liquids although primarily the valve is adapted to control both the volume and the degree of mixing of hot and cold water to be directed through a spout.

The present mixing valve is so constructed as to permit its use by children as well as adults with a minimum of instruction, the valve being so constructed and arranged as to permit a selection of the volume of liquid to be directed through the spout followed by actuation of the valve to control the temperature of the liquid flowing through the spout. Thus there are but two manual operations both of which may be positively performed by the user of the valve.

The inventor is aware that various mixing valves have been proposed, some of which are now on the market but in every instance so far as the inventor is aware, the valves are complicated of structure, expensive to purchase and not easily operated. It is with the idea of overcoming the faults just mentioned that the present invention was devised.

Figure 4:
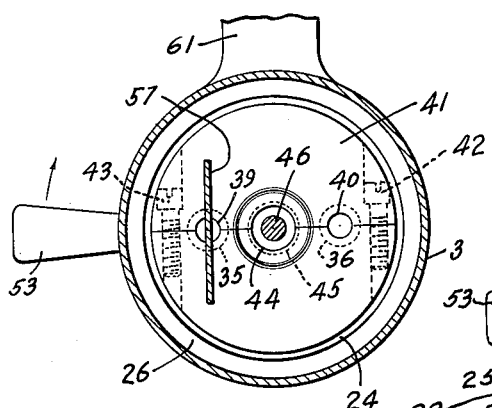
Figure 4 is a fragmentary cross-sectional view on the line 4—4 of Figure 1.

Referring now to the drawings, I have provided for the mixing valve a substantially circular casing or housing 1 having a base 2, with a cap 3 of concavo-convex form adapted to close the normally open end 4 of the casing or housing.

Figure 1:
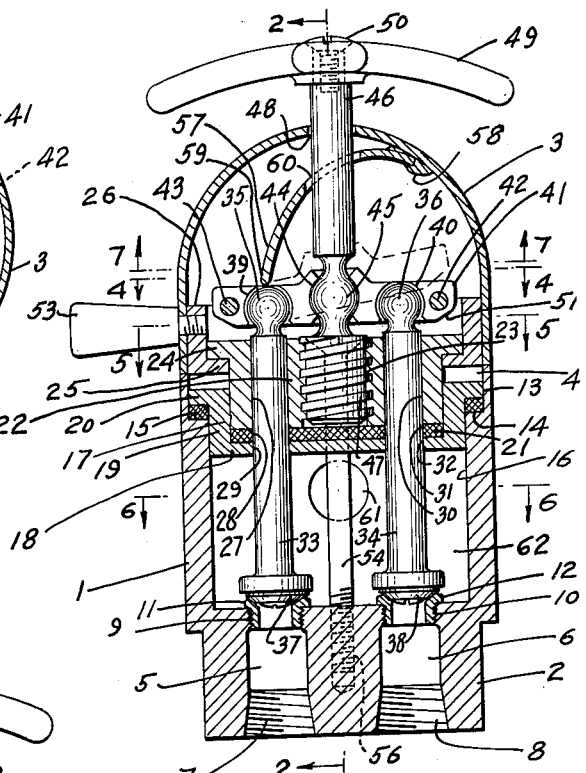
Figure 1 is a vertical sectional view taken on the line 1—1 of Figure 2.

The base 2 is of block form and provided with a pair of spaced apart transverse bores 5 and 6 the bounding walls of which bores are tapered in part and screw threaded as shown at 7 and 8 to receive pipes from sources of hot water and of cold water. In the showing of Figure 1, the bore 5 is for hot water and the bore 6 for cold water. These bores communicate with the interior of the casing or housing and are screw threaded at 9 and 10 to receive valve seat members 11 and 12. The casing or housing is enlarged as to internal diameter at 13 to provide an annular ledge or flange 14. Furthermore the enlarged diameter portion of the casing or housing at 13 corresponds to the internal diameter of a portion of the cap 3 as shown in the figures. Carried on the ledge or flange 14 is a gasket 15 and in part resting upon the gasket 15 and confined within the enlarged diameter portion 13 and the lower diameter portion 16, is a cuplike member 17. Member 17 has a base 18, an annular side wall 19 fitting closely within the portion 16 of the casing or housing and an annular flange 20 connected to the annular wall 19 which fits closely within the enlarged diameter portion 13 of the housing. As shown, the flange 20 rests upon the gasket 15. Within the cuplike member 17 and resting within and upon the base 18 is a packing disk 21. Confined in part within the cuplike member is an enlarged nut 22, the base of which rests upon the packing 21, which nut has a central threaded bore at 23 and the nut is provided with a top annular flange 24. The top annular flange 24 rests upon flange 25 of collar 26 which collar fits within the cap 3. The nut 22, packing 21 and base 18 are provided with co-axial bores at 27 to 29 inclusive and at 30, 31 and 32 to provide two sets of bores in axial alignment with the bores of the valve seats 11 and 12. Positioned within the aligned bores 27, 28 and 29 is valve stem 33 and received within bores 30, 31 and 32 is valve stem 34. Each valve stem is provided with a spherical ball head as shown at 35 and 36 while the opposite ends of said stems 33 and 34 carry valves 37 and 38, which valves are adapted to cooperate with valve seat members 11 and 12. The heads 35 and 36 are socketed at 39 and 40 within a split plate or disk 41. The two halves of this disk or plate are held together in any appropriate manner such as by the screws shown in Figure 4 at 42 and 43 received in screw threaded bores which are chords of the disk. The disk or plate 41 is provided with a central socket 44, which socket receives and confines a ball or spherical portion 45 formed on a stem 46, the stem provided with an enlarged diameter screw threaded plug 47 which has threaded engagement with the threads 23 of nut 22. The stem 46 is passed through a central opening 48 in the cap 3 and is provided with an external handle 49 secured to the end of the stem by screw means 50. The bottom of the disk or plate is chamfered at 51.

Figure 2:
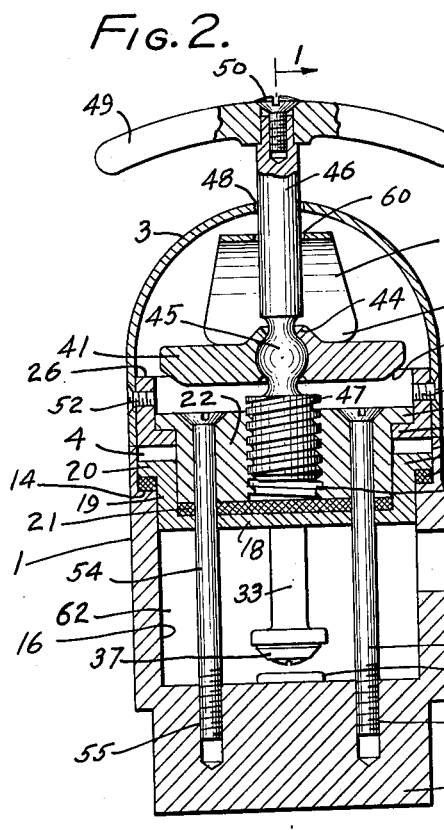
Figure 2 is a fragmentary sectional view on the line 2—2 of Figure 1 and illustrating one embodiment of my invention.
Figure 5:
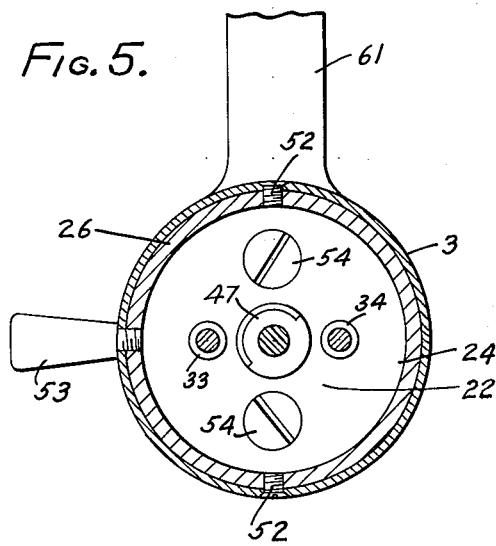
Figure 5 is a fragmentary cross-sectional view on line 5—5 of Figure 1.
Figure 7:
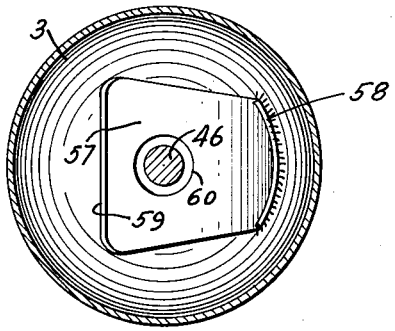
Figure 7 is a cross-sectional view on the line 7—7 of Figure 1.
Figure 6:
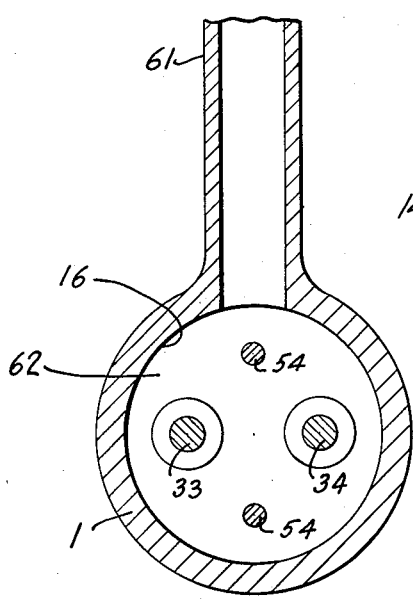
Figure 6 is a fragmentary cross-sectional view on the line 6—6 of Figure 1.

To hold the several parts of the mixing valve in working relationship, I have passed a plurality of screws 52 through the cap into collar 26 and I have also provided an external handle 53 which has a screw end for passage through an opening in the cap and into the collar 26 as shown in Figure 1. To hold the casing or housing 1, nut 22, packing 21 and member 17 in working relationship, I have passed elongated screws such as shown in Figure 2 at 54 through bores in the packing 21, nut 22 and cuplike member 17, which screws have threaded engagement with threaded bores 55 and 56 in the base 2 of the housing or casing.

Within the cap I have provided a curved blade 57 secured in any desired manner at one end to the cap as shown at 58 while the opposite end of said blade engages the disk or plate 41 and specifically the top surface thereof. This blade varies as to width as shown in Figure 2 from the top portion which is secured to the cap as shown at 58 to the free end 59. Preferably the blade is formed from spring like material. The blade is bored at 60 to permit passage therethrough of the stem 46. As shown in Figure 2, the housing or casing is provided with a spout 61 which communicates with the flow receiving chamber 62 being the chamber included between the inner surface of base 2 and the bottom surface of cup shaped member 17 and the circular wall of the casing or housing.

Figure 3:
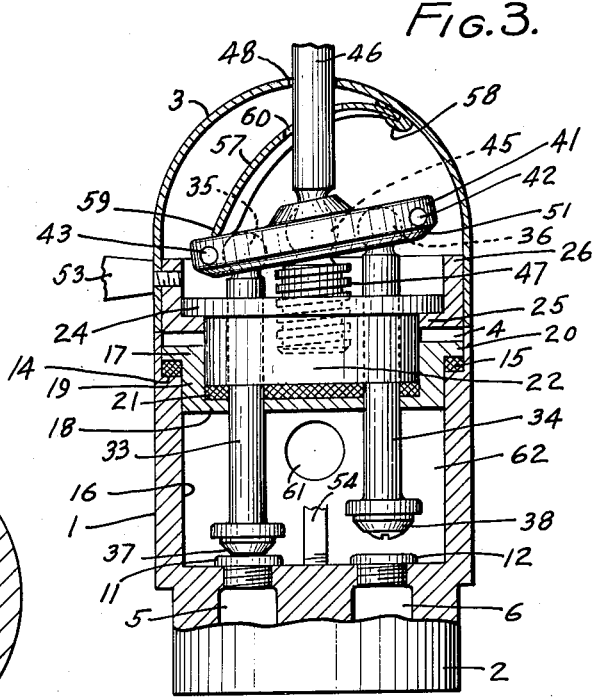
Figure 3 is a fragmentary vertical sectional view, similar to that of Figure 1, one of the valves being in moved position.

The operation, uses and advantages of the invention just described are as follows:

That form of the invention shown provides a structure which is easily assembled and operated. The threaded openings at 7 and 8 have connection with service lines for water or other liquid which is to be mixed. In the present instance, I contemplate that the hot water inlet is connected at 7 and the cold water inlet at 8. Assuming the parts in the position as shown in Figure 1, the valve stem 46 has been rotated so that the valves 37 and 38 are seated against the seats 11 and 12 and hence do not permit inflow of any liquids to the mixing chamber 62 of the casing or housing. Upon rotating the handle 49 to lift the valve stem 46, both valves 37 and 38 will be raised from their seats 11 and 12 respectively, as shown for instance in Figure 3. This regulates the volume of liquid which will flow through the spout 61. The operator may wish to obtain a certain temperature in the water or other liquid flowing through the spout, either extremely hot or cold or medium and to obtain the mixing desired, the operator then moves handle 53 which revolves cap 3, the cap provided internally with the curved arm 57, the outermost end of which arm engages disk 41. Rotation of the handle 53 rotates the cap 3 and causes travel of the arm 57 over the top surface of the disk 41. The arm is preferably formed of a spring-like material and is capable of bending. Such movement of the arm on the surface of the disk tips the disk as shown by the dotted line position in Figure 1. In so tipping the disk 41, one valve may be moved closer to its seat than the other valve which would be the case for the dotted tipped position of the disk in Figure 1; i.e., the hot water supply would be shut off to the mixing chamber 62 and the cold water would be delivered into the mixing chamber. However, the volume of water flowing through the spout would remain the same as the volume is regulated by the degree of raising of the valves when handle 49 is rotated to elevate stem 46. Thus there is a nicety of balance and a degree of balance between the mixing of two liquids that is quite difficult to obtain in ordinary systems using two separate spigots, one for hot water and one for cold.

As shown in Figures 1 and 2, the socket portion 44 for ball 45 communicates with conical portions on both surfaces of the disk 41 which readily accommodates the neck portions of the stem 46 which connect with the ball 45 and thereby permits a ready tipping of the said disk to various positions when the cap 3 is rotated by the handle 53.

I claim:

1. A mixing valve having a casing provided with a side wall and a base and a rotatable cap carried by said casing and provided with means for effecting said cap rotation, said base provided with a pair of valve seats and a pair of ports communicating with said valve seats, said casing having a liquid receiving chamber, a valve for each valve seat, each valve provided with a valve stem terminating in a ball head, a plate formed with sockets for receiving said ball heads, said plate provided with a central socket and a central stem provided with a ball portion positioned in said central socket for mounting the plate on the central stem, said central stem extending through the cap and provided with a handle exterior the cap and the opposite end of said central stem provided with a threaded plug, a nut within said casing and fixedly mounted thereto against movement, for engagement with said threaded plug, the valve stems being passed through openings provided in said nut, and said cap being internally provided with a spring arm engaging the plate for tipping the plate on its mounting when the rotatable cap is rotated, and the central stem is rotated to move the threaded plug relative to the fixed nut to raise the valve stems and the valves carried thereby from their seats.

2. The device of claim 1, and a cup member fitted within the casing and defining a wall portion for the liquid receiving chamber, the nut being fitted within said cup member and means for anchoring the nut and cup member to the base of the casing.

References Cited in the file of this patent
UNITED STATES PATENTS

| | | |
|---|---|---|
| 2,646,821 | Johansson et al. | July 28, 1953 |
| 2,898,938 | Dombre | Aug. 11, 1959 |